United States Patent
Sugimoto et al.

(10) Patent No.: US 9,420,671 B1
(45) Date of Patent: Aug. 16, 2016

(54) LIGHTING CONTROL SYSTEM

(71) Applicant: Yazaki Corporation, Tokyo (JP)

(72) Inventors: Terumitsu Sugimoto, Makinohara (JP);
Tomonori Ohashi, Makinohara (JP);
Hiroko Aono, Makinohara (JP); Kazuya Sato, Makinohara (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 15/003,906

(22) Filed: Jan. 22, 2016

(30) Foreign Application Priority Data

Jan. 23, 2015 (JP) ................................ 2015-011423

(51) Int. Cl.
*B60Q 1/14* (2006.01)
*H05B 37/02* (2006.01)

(52) U.S. Cl.
CPC .......... *H05B 37/0281* (2013.01); *B60Q 1/1415* (2013.01)

(58) Field of Classification Search
CPC .................................... B60Q 1/02; B60Q 1/26
USPC .............................. 315/77, 82; 307/10.1, 10.8
See application file for complete search history.

(56) References Cited

U.S. PATENT DOCUMENTS

| | | | | |
|---|---|---|---|---|
| 7,258,463 B2 * | 8/2007 | Sloan | ................ | H05B 33/0803 362/227 |
| 8,878,455 B2 * | 11/2014 | Hatley | ............... | H05B 33/0863 315/294 |
| 8,941,311 B2 * | 1/2015 | Grave | ................ | H05B 33/0845 315/160 |
| 9,041,308 B2 * | 5/2015 | Hatley | ............... | H05B 33/0863 315/291 |
| 2008/0007180 A1 * | 1/2008 | Kesterson | ............ | B60Q 1/2603 315/82 |
| 2015/0163871 A1 * | 6/2015 | Takeshi | .................. | B60Q 11/00 315/82 |

FOREIGN PATENT DOCUMENTS

| | | |
|---|---|---|
| JP | 2007-125986 A | 5/2007 |
| JP | 2012-66605 A | 4/2012 |
| JP | 2013-95325 A | 5/2013 |
| JP | 2014-103078 A | 6/2014 |

* cited by examiner

*Primary Examiner* — Thuy Vinh Tran
(74) *Attorney, Agent, or Firm* — Sughrue Mion, PLLC

(57) ABSTRACT

A lighting control system includes a plurality of light sources, a plurality of light source drivers, each of the light source drivers being configured to adjust a light emission intensity of an associated one of the light sources in at least two levels, and an integrated controller configured to control the light source drivers to control conditions of the light sources in an integrated manner. The integrated controller is configured to control the light source drivers to execute a light intensity transition of reducing the light emission intensity from a first light intensity level to a second light intensity level that is lower than the first light intensity level with respect to each of the light sources such that a timing at which the light intensity transition ends is substantially the same for each of the light sources.

8 Claims, 10 Drawing Sheets

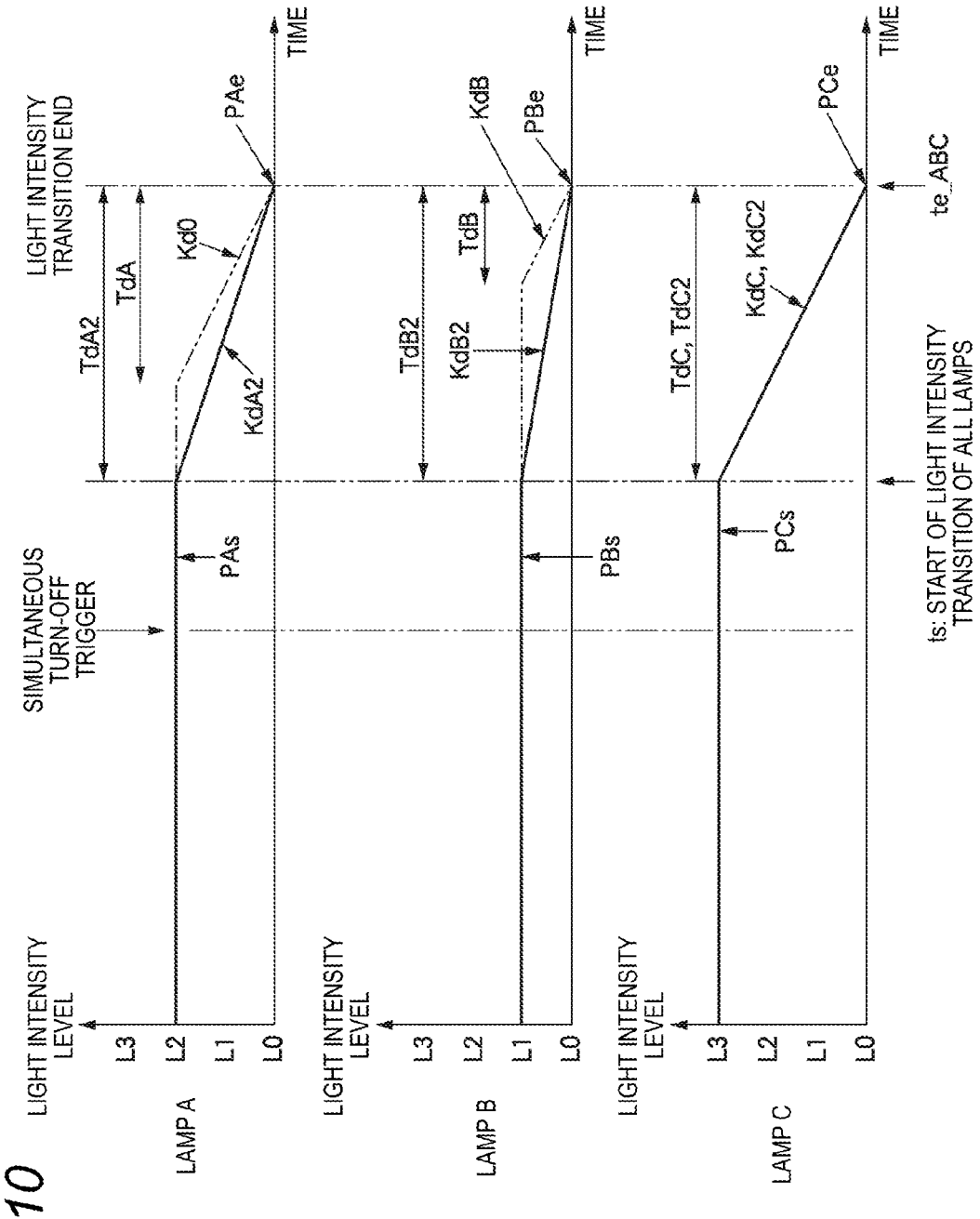

LIGHTING CONTROL SYSTEM

CROSS-REFERENCE TO RELATED APPLICATIONS

The present application claims priority from Japanese Patent Application No. 2015-011423 filed on Jan. 23, 2015, the entire content of which is incorporated herein by reference.

FIELD OF INVENTION

The present invention relates to a lighting control system that can be applied in a case in which, for example, a plurality of lamps mounted on a vehicle is to be operated in a coordinated manner.

RELATED ART

Large number of various lamps are mounted on a vehicle, inside and outside the vehicle interior. Various related art proposals are being made to control such vehicle lamps.

A first related art is directed to an interior lamp control device for controlling a plurality of interior lamps arranged inside a vehicle interior, with an improved decorative effect and quality feeling. Specifically, an opening of a door is detected by a sensor, and a controller outputs signals to interior lamps arranged on a side of the opened door such that the interior lamps are turned on sequentially from a vehicle outer side toward a vehicle inner side (see, e.g., JP2007-125986A).

A second related art is directed to a light control for controlling a plurality of light sources such that their brightness becomes equal to each other regardless of light-emission wavelength and regardless of whether it is daytime or nighttime. To reduce light, a duty cycle control is controlled. A plurality of signals are sent to the plurality of light sources such that the light sources are turned on and off at different timings (see, e.g., JP2012-66605A).

A third related are is directed to a system for that enables a linked processing with high flexibility between a plurality of lighting circuits for individually controlling lamps arranged at a plurality of locations on a vehicle. Specifically, two lighting circuits are provided for individually controlling headlamps arranged on both sides at a front portion of a vehicle, such that the lighting circuits perform a linked processing based on a communication through a dedicated communication line (see, e.g., JP2013-95325A).

A fourth related art is directed to a lamp device in which color and brightness of a vehicle LED are adjustable with a single light control operation (see, e.g., JP2014-103078A).

In accordance with a situation, various lamps mounted on a vehicle are switched on and off and/or the brightness of the lamps are changed, automatically or by a manual switch operation performed by a driver of the vehicle. As for the automatic switching, for example, the headlamps may be turned on and off in association with the running condition of the vehicle or a change in the vehicle speed, vehicle interior lighting may be turned on and off in association with opening and closing of a door, and/or the brightness of illumination of a meter unit or the like inside the vehicle interior may be turned on and off in association with the brightness of environment such as daytime or nighttime.

There are a large number of lamps mounted on a vehicle, and turning on and off and/or lighting intensities of these lamps are controlled independently and/or in a linked manner.

However, even when a plurality of lamps are controlled in a linked manner, it is often the case that a driver and/or others on a vehicle feel that actually perceived light-intensity switching operations of a plurality of lamps are performed in an uncoordinated manner at their respective timings. This may give, at the time of lighting-intensity switching operations in the vehicle, a driver of the vehicle a strange feeling, a suspicion that there might be a device trouble, and/or low quality impression.

SUMMARY

Illustrative aspects of the present invention provide a lighting control system configured to switch light intensities of a plurality of lamps such that an integrated feeling is given based on light-intensity switching operations that are actually perceived by a driver and/or others.

According to an illustrative aspect of the present invention, a lighting control system is provided. The lighting control system includes a plurality of light sources, a plurality of light source drivers, each of the light source drivers being configured to adjust a light emission intensity of an associated one of the light sources in at least two levels, and an integrated controller configured to control the light source drivers to control conditions of the light sources in an integrated manner. The integrated controller is configured to control the light source drivers to execute a light intensity transition of reducing the light emission intensity from a first light intensity level to a second light intensity level that is lower than the first light intensity level with respect to each of the light sources such that a timing at which the light intensity transition ends is substantially the same for each of the light sources.

Other aspects and advantages of the invention will be apparent from the following description, the drawings and the claims.

BRIEF DESCRIPTION OF THE DRAWINGS

FIG. 10 is a time chart showing an example of operations in a case of executing the processing algorithm of FIG. 8.

DETAILED DESCRIPTION

Hereinafter, exemplary embodiments of the present invention will be described in detail with reference to the drawings.

First Embodiment

Figure 1:
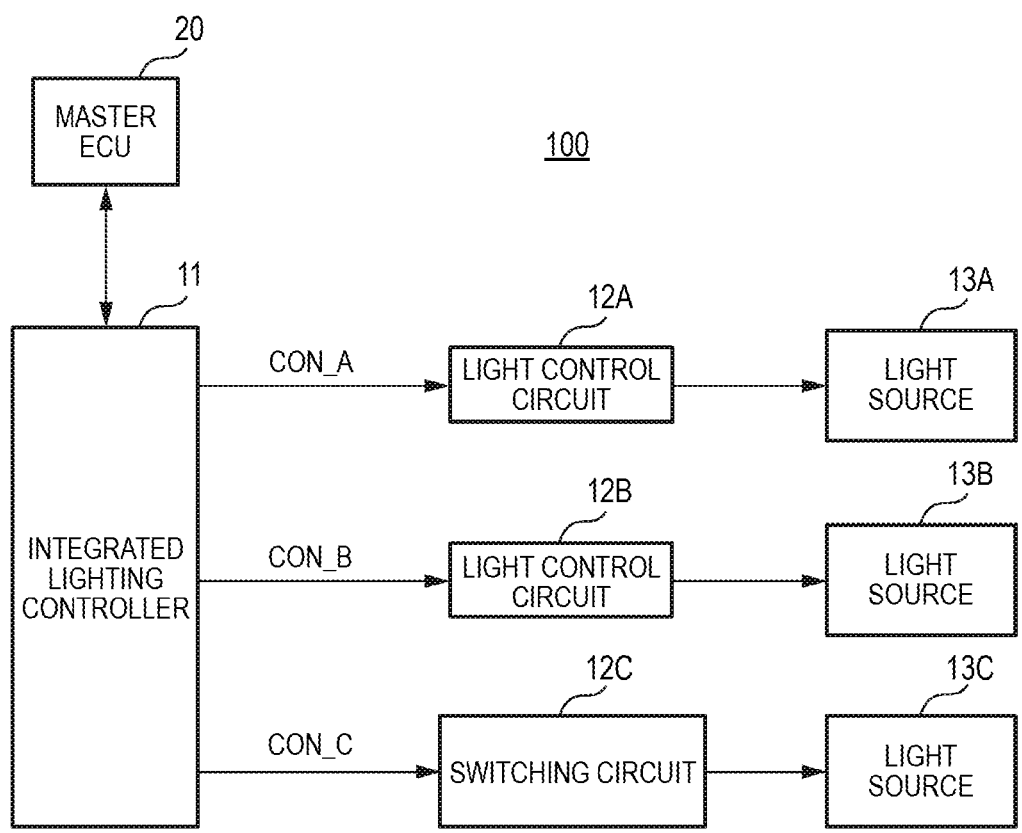
FIG. 1 is a block diagram of a configuration of a lighting control system according to an exemplary embodiment of the present invention.

FIG. 1 shows an exemplary configuration of a lighting control system 100 according to an exemplary embodiment of the present invention. The lighting control system 100 is adapted to be mounted on a vehicle and is configured to control a plurality of lamps on the vehicle, such as turning on and off of the lamps, in an integrated manner. However, the present invention is not limited to vehicle applications, and may be applied in other non-vehicle lighting systems.

As shown in FIG. 1, the lighting control system 100 includes an integrated lighting controller 11, two light control circuits 12A and 12B, a switching circuit 12C, three independent light sources 13A, 13B, 13C, and a master electronic control unit (ECU) 20. In the example of FIG. 1, the three independent light sources 13A to 13C are to be controlled. However, only two light sources or more than three light sources may be controlled.

Typical examples of the light sources 13A, 13B, 13C include headlamps, fog lamps, tail lamps, side-marker lamps or the like arranged on the outer side of a vehicle body. Room lamps, illumination lamps for an instrument panel or the like arranged in the vehicle interior may also be controlled.

In the example shown in FIG. 1, each of the light sources 13A and 13B is a lamp that requires light-intensity adjustment and the light source 13C is a lamp that requires only switching on and off operations. Thus, the light source 13A is connected to the output of a light control circuit 12A and the light source 13B is connected to the output of a light control circuit 12B. Further, the light source 13C is connected to the output of a switching circuit 12C.

The switching circuit 12C includes, for example, a switching element such as a transistor or a relay, and is configured to switch the energization from a power supply of the vehicle to the light source 13C on and off in a binary manner. The switching on and off of the light source 13C is depends on a control signal CON_C input from the integrated lighting controller 11.

The light control circuit 12A includes, for example, a switching element such as a transistor, and is configured to control the energization from the power supply of the vehicle to the light source 13A to be switched on and off. Further, light control circuit 12A is configured such that the average current flowing through the light source 13A can be adjusted by periodically repeating the switching on and off of the energization using periodically-generated pulse signals and by changing the pulse width to adjust the duty cycle. This enables the adjustment of the light emission intensity of the light source 13A. In response to a control signal CON_A input from the integrated lighting controller 11, the light control circuit 12A can switch the light source 13A on and off or adjust the electric current in a stepwise manner in at least two levels.

Similarly, the light control circuit 12B includes, for example, a switching element such as a transistor, and is configured to control the energization from the power supply of the vehicle to the light source 13B to be switched on and off. Further, the light control circuit 12B is configured such that the average current flowing through the light source 13B can be adjusted by periodically repeating the switching on and off of the energization using periodically-generated pulse signals and by changing the pulse width to adjust the duty cycle. In response to a control signal CON_B input from the integrated lighting controller 11, the light control circuit 12B can switch the light source 13B on and off or adjust the electric current in a stepwise manner in at least two levels.

For example, the integrated lighting controller 11 is constructed from logic circuits including a microcomputer as a main component, and then can perform relatively complicated control in accordance with a program incorporated in advance. In the lighting control system 100 shown in FIG. 1, the integrated lighting controller 11 can control the three light sources 13A, 13B, 13C individually or in an integrated manner. Further, the integrated lighting controller 11 can perform data communication with the master ECU 20 through a predetermined communication network on the vehicle and hence can identify the situation on the basis of acquired various information.

For example, conditions of operation switches (not shown) used for individually switching the light sources 13A, 13B, 13C on and off or switching the light intensities of the light sources 13A, 13B, 13C through a manual operation by a user are read by the master ECU 20, and are transmitted as information to the integrated lighting controller 11. Based on the input information, the integrated lighting controller 11 controls one or more of the control signals CON_A, CON_B, CON_C so as to switch the state of one or more of the light sources 13A, 13B, 13C.

Further, for example, conditions of a plurality of light sources, such as headlamps, are automatically switched in accordance with the running condition of a vehicle, and/or conditions of a plurality of light sources, such as room lamps, are automatically switched in accordance with opening and closing of a door. In such a situation, on the basis of various information input from the master ECU 20, the integrated lighting controller 11 can identify whether integrated control of two or three of the light sources 13A, 13B, 13C need to be switched, on the basis of comparison with a condition set in advance. Then, in accordance with the situation, switching of the plurality of light sources, such as switching on and off the plurality of light sources, is performed in an integrated manner.

Figure 4:
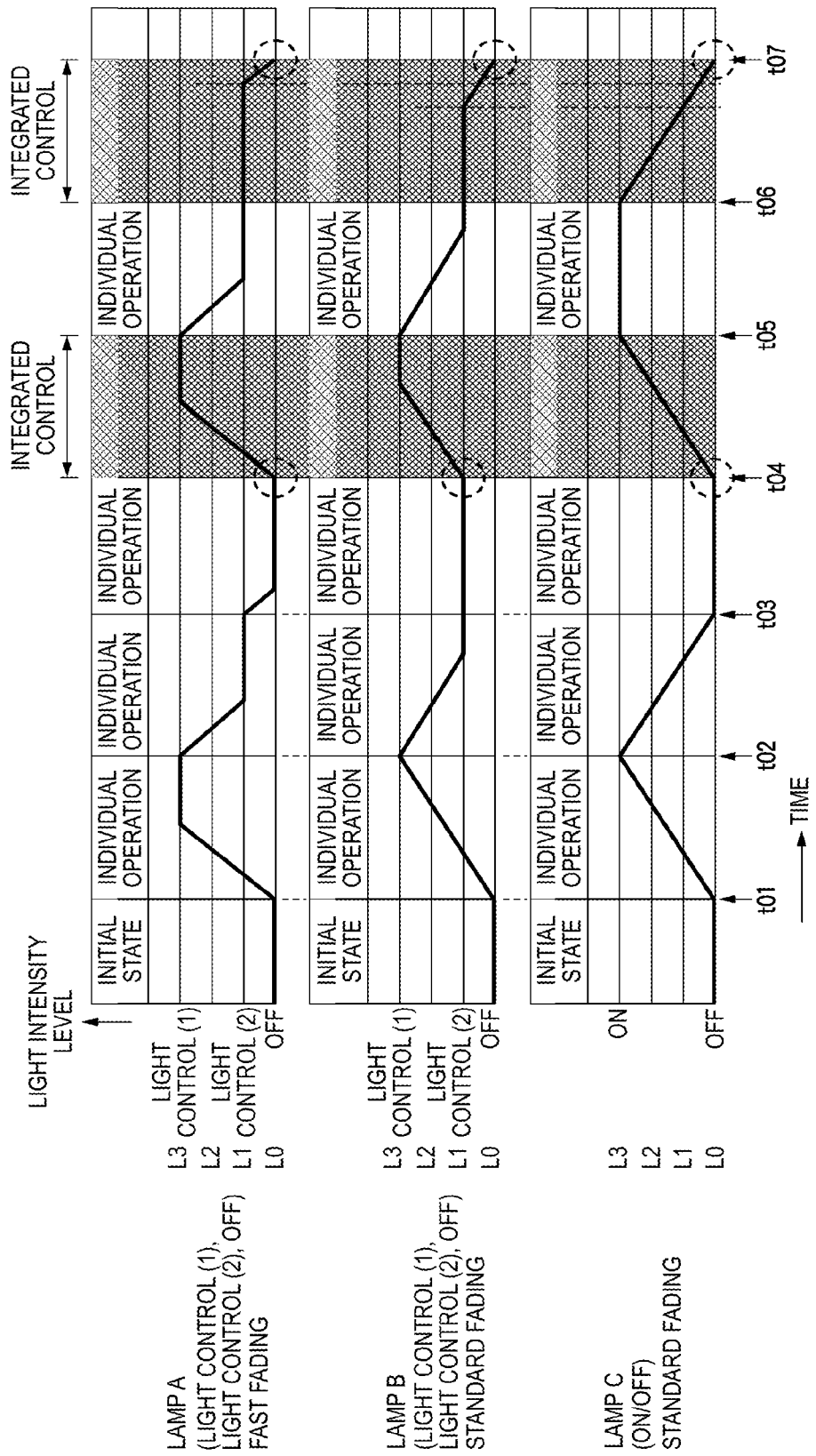
FIG. 4 is a time chart showing an example of operations in the lighting control system of FIG. 1.

FIG. 4 illustrates an example of operations in the lighting control system 100 of FIG. 1. In FIG. 4, the horizontal axis of each graph indicates the time. Further, as for the light intensity level in the vertical axis, L3 indicates the maximum (the light intensity is 100%), L0 indicates a switched off condition (the light intensity is 0%: an OFF level), and each of L1 and L2 indicates a fraction of light intensity between L0 and L3. Further, a lamp A, a lamp B, and a lamp C of FIG. 4 correspond to the light sources 13A, 13B, 13C in FIG. 1, respectively.

As shown in FIG. 4, for example, when the lamp C is switched from OFF (OFF: L0) to ON (ON: L3), it takes a certain amount of time until the actual light intensity level is switched from L0 to L3. That is, the time required for light-intensity level transition depends on, for example, switching characteristics of the individual light sources and characteristics of the circuit for switching the light source on and off.

In the actual lighting control system 100, in some cases, the plurality of light sources to be controlled may have light intensity transition characteristics (e.g., a slope of rise/fall) that are common to each other, different from each other, or in some cases, the light intensity transition characteristics of the respective light sources may be changed depending on a situation.

In the example shown in FIG. 4, the lamp A has a relatively steep slope (faster fading) in the light intensity transition characteristics and the lamp B and the lamp C have a standard slope (standard fading) in the light intensity transition characteristics. For example, in FIG. 4, light intensity transition of the lamp A and the lamp B is started simultaneously at time t01. However, the required time until the light intensity level goes from L0 to L3 is shorter in the lamp A and longer in the lamp B. Thus, light intensity transition of the lamp A is completed first. Further, in FIG. 4, light intensity transition of the lamp B and the lamp C is started simultaneously at time t01. The required times until the light intensity level goes from L0 to L3 are almost the same. Thus, light intensity transition of the lamp B and the lamp C are completed almost simultaneously.

Further, in the example shown in FIG. 4, the lamp C is controlled to be switched on or off only. That is, the light intensity level of the lamp C is switched to either an OFF level (L0) or an ON level (L3). As for the lamp A and the lamp B, in addition to the on and off control, selective switching of light control (1) (L3) and light control (2) (L1) can be performed.

In the example shown in FIG. 4, "individual operation" is performed in an interval from time t01 to time t04 and in an interval from time t05 to time t06. Further, "integrated control" is performed in an interval from time t04 to time t05 and in an interval from time t06 to time t07. The "individual operation" indicates that a particular lamp is switched on or off or a light control condition of the particular lamp is switched based on, for example, a switching operation by a user. Further, the "integrated control" indicates that integrated control is performed when a plurality of lamps are to be simultaneously operated under the control of the integrated lighting controller 11.

In the example of operation in FIG. 4, at time t1, transition start of the lamp A from L0 to L3, transition start of the lamp B from L0 to L3, and transition start of the lamp C from L0 (OFF) to L3 (ON) are performed by "individual operation". Further, at time t2, transition start of the lamp A from L3 to L1, transition start of the lamp B from L3 to L1, and transition start of the lamp C from L3 to L0 are performed. Furthermore, at time t03, transition start of the lamp A from L1 to L0 is performed and then, at time t5, transition start of the lamp A from L3 to L1 and transition start of the lamp B from L3 to L1 are performed.

Further, in the "integrated control", at time t4, transition start of the lamp A from L0 to L3, transition start of the lamp B from L1 to L3, and transition start of the lamp C from L0 to L3 are performed. Furthermore, in a "integrated control" interval from time t06 to time t07, although the transition start timings of the lamps are different from each other, light intensity transition of the lamp A, the lamp B, and the lamp C is completed at common time t07. Such "integrated control" is executed by the integrated lighting controller 11.

Figure 2:
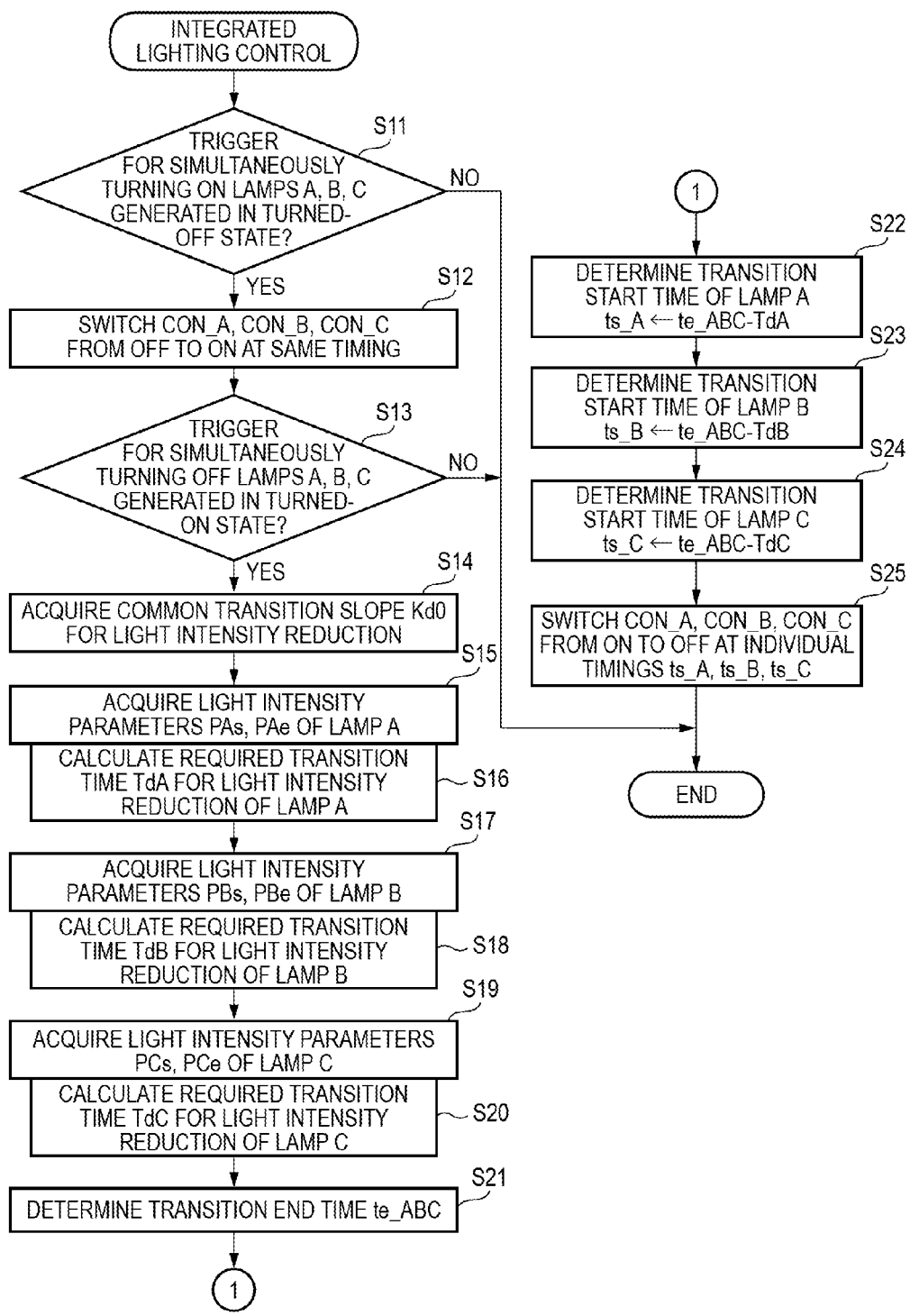
FIG. 2 is a flow chart of a processing algorithm of an example of an integrated lighting control applicable to the lighting control system of FIG. 1.
Figure 3:
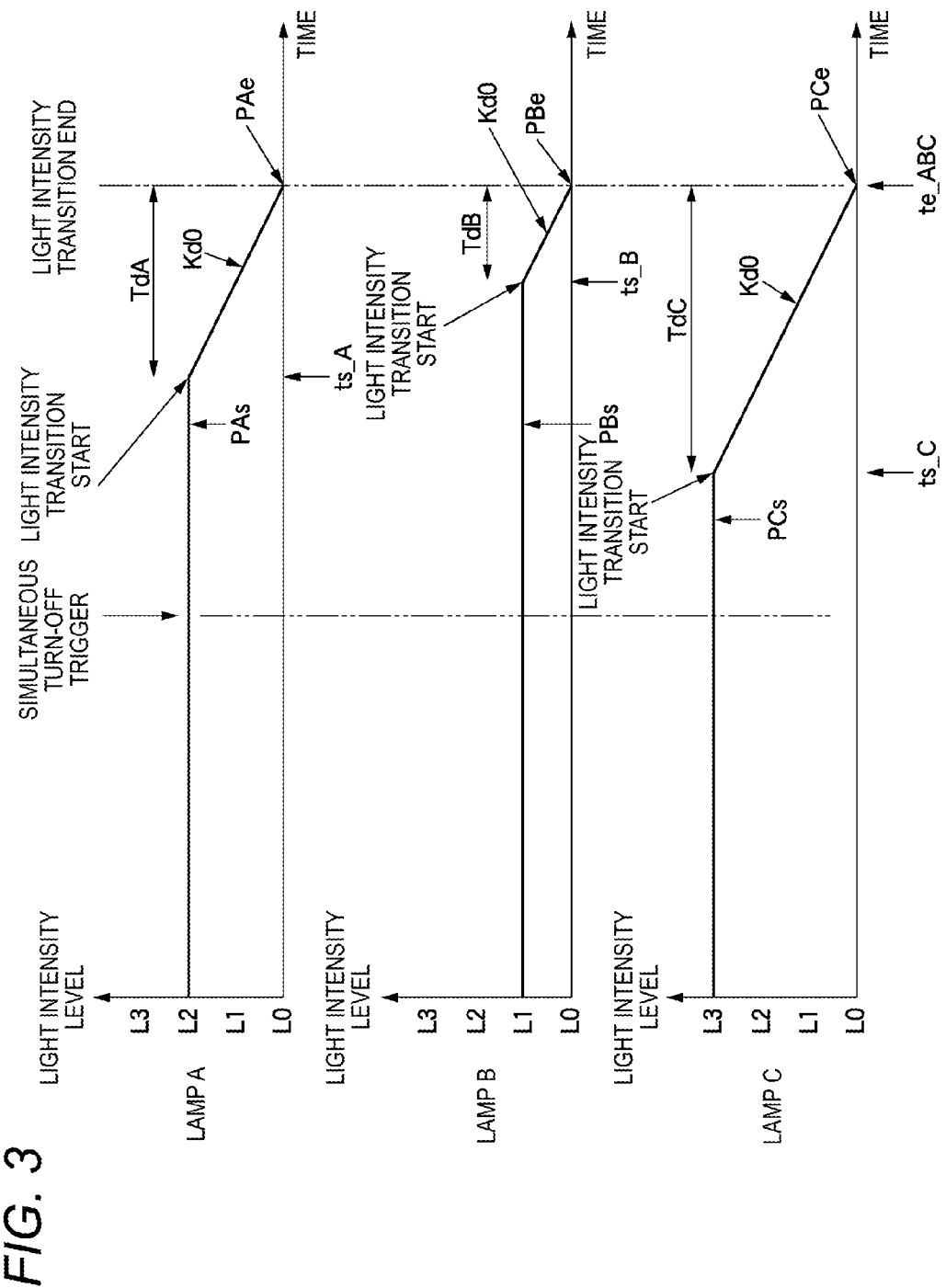
FIG. 3 is a time chart showing an example of operations in a case of executing the processing algorithm of FIG. 2.

FIG. 2 shows a processing algorithm of an example of an integrated lighting control applicable to the lighting control system 100 of FIG. 1. FIG. 3 shows a detailed example of operations in a case of executing the processing algorithm shown in FIG. 2.

For example, when the microcomputer of the integrated lighting controller 11 in FIG. 1 executes the processing procedure of "integrated lighting control" shown in FIG. 2, the "integrated control" shown in FIG. 4 or the operation shown in FIG. 3 can be achieved.

In the processing shown in FIG. 2, the lamp A, the lamp B and the lamp C (corresponding to light sources 13A, 13B, 13C) to be controlled have characteristics like those shown in FIG. 3. That is, among the lamp A, the lamp B and the lamp C to be controlled, there are at least two light intensity levels at the time of at least one of transition start and transition end. Further, there is only one slope characteristic (Kd0) at the time of switching for reducing the light intensity level.

In Step S11 of FIG. 2, with the lamp A, the lamp B and the lamp C being turned off, the integrated lighting controller 11 determines whether a trigger for simultaneously turning on all of the lamp A, the lamp B, and the lamp C has been generated. For example, when the trigger is generated under a certain condition inside the master ECU 20 or the integrated lighting controller 11 in response to a detection of a condition such as a change of the running condition of the vehicle or an opening/closing of a door, the procedure moves forward from S11 to S12 in FIG. 2.

In Step S12, the integrated lighting controller 11 switches each of the control signals CON_A, CON_B, and CON_C from OFF to ON. By virtue of this, like the operation at time t04 shown in FIG. 4, light intensity transition of the lamp A, light intensity transition of the lamp B, and light intensity transition of the lamp C are simultaneously started.

In Step S13, with the lamp A, the lamp B and the lamp C being turned on, the integrated lighting controller 11 determines whether a trigger for simultaneously turning off all of the lamp A, the lamp B, and the lamp C or switching them into a light intensity level lower than the present one has been generated. For example, when the trigger is generated under a certain condition inside the master ECU 20 or the integrated lighting controller 11 in response to a detection of a condition such as a change of the running condition of the vehicle or an opening/closing of a door, the procedure moves forward from S13 to S14 in FIG. 2.

In Step S14, the integrated lighting controller 11 acquires a transition slope value Kd0 (see FIG. 3) for the light intensity reduction that is common to all the three lamps, the lamp A, the lamp B and the lamp C. The transition slope value Kd0 for the light intensity reduction may be predefined as a system-specific value and saved in a memory inside the integrated lighting controller 11.

In Step S15, the integrated lighting controller 11 acquires a transition start light intensity parameter PAs and a transition end light intensity parameter PAe that are associated with the lamp A. For example, in the example shown in FIG. 3, the light intensity parameter PAs at the time that a simultaneous turn-off trigger is generated is L2 and the light intensity parameter PAe is L0. These light intensity parameters PAs and PAe can be identified based on predefined system-specific information (L0, L1, L2, L3) and the present control status (the light intensity levels before and after the switching).

In Step S16, the integrated lighting controller 11 calculates a required transition time TdA for light intensity reduction of the lamp A. That is, as shown in FIG. 3, based on the transition start light intensity parameter PAs, the transition end light intensity parameter PAe and the transition slope value Kd0 for the light intensity reduction, the required transition time TdA for light intensity reduction corresponding to the time difference from the transition start timing ts_A to the transition end timing te_ABC can be calculated by the following formula.

$$TdA = te\_ABC - ts\_A = (PAs - PAe)/Kd0$$

Here, in a case in which the results of calculation performed in advance have been saved as the data of constants in the memory inside the integrated lighting controller 11, an appropriate TdA can selectively be acquired based on the parameters PAs, PAe, Kd0 without calculation.

In Step S17, similarly to step S15, the integrated lighting controller 11 acquires a transition start light intensity parameter PBs and a transition end light intensity parameter PBe that are associated with the lamp B. For example, in the example shown in FIG. 3, the light intensity parameter PBs at the time that a simultaneous turn-off trigger is generated is L1 and the light intensity parameter PBe is L0. These light intensity parameters PBs and PBe can be identified based on predefined system-specific information (L0, L1, L2, L3) and the present control status (the light intensity levels before and after the switching).

In Step S18, the integrated lighting controller 11 calculates a required transition time TdB for light intensity reduction of the lamp B. That is, as shown in FIG. 3, based on the transition start light intensity parameter PBs, the transition end light intensity parameter PBe and the transition slope value Kd0 for the light intensity reduction, the required transition time TdB for light intensity reduction corresponding to the time difference from the transition start timing ts_B to the transition end timing te_ABC can be calculated by the following formula.

$$TdB = te\_ABC - ts\_B = (PBs - PBe)/Kd0$$

Here, in a case in which the results of calculation performed in advance have been saved as the data of constants in the memory inside the integrated lighting controller 11, an appropriate TdB can selectively be acquired based on the parameters PBs, PBe, Kd0 without calculation.

In Step S19, similarly to step S15, the integrated lighting controller 11 acquires a transition start light intensity parameter PCs and a transition end light intensity parameter PCe that are associated with the lamp C. For example, in the example shown in FIG. 3, the light intensity parameter PCs at the time that a simultaneous turn-off trigger is generated is L3 and the light intensity parameter PCe is L0. These light intensity parameters PCs and PCe can be identified based on predefined system-specific information (L0, L1, L2, L3) and the present control status (the light intensity levels before and after the switching).

In Step S20, the integrated lighting controller 11 calculates a required transition time TdC for light intensity reduction of the lamp C. That is, as shown in FIG. 3, based on the transition start light intensity parameter PCs, the transition end light intensity parameter PCe and the transition slope value Kd0 for the light intensity reduction, the required transition time TdC for light intensity reduction corresponding to the time difference from the transition start timing ts_C to the transition end timing te_ABC can be calculated by the following formula.

$$TdC = te\_ABC - ts\_C = (PCs - PCe)/Kd0$$

Here, in a case in which the results of calculation performed in advance have been saved as the data of constants in the memory inside the integrated lighting controller 11, an appropriate TdC can selectively be acquired based on the parameters PCs, PCe, Kd0 without calculation.

In Step S21, the integrated lighting controller 11 determines an appropriate transition end timing te_ABC. That is, a result obtained by adding to the present time a time greater than the maximum among the three required transition times TdA, TdB, TdC for light intensity reduction is set as the transition end timing te_ABC.

In Step S22, the integrated lighting controller 11 determines the transition start timing ts_A in the lamp A in accordance with the following formula.

$$ts\_A = te\_ABC - Td\_A$$

In Step S23, the integrated lighting controller 11 determines the transition start timing ts_B in the lamp B in accordance with the following formula.

$$ts\_B = te\_ABC - Td\_B$$

In Step S24, the integrated lighting controller 11 determines the transition start timing ts_C in the lamp C in accordance with the following formula.

$$ts\_C = te\_ABC - Td\_C$$

In Step S25, at the timings ts_A, is B, and ts_C, the integrated lighting controller 11 switches the control signals CON_A, CON_B, and CON_C from ON to OFF or from the transition start level to the transition end level.

When the processing procedure shown in FIG. 2 is executed, as shown in FIG. 3, the transition end time of light intensity reduction of the lamp A, the transition end time of light intensity reduction of the lamp B, and the transition end time of light intensity reduction of the lamp C can be made equal to a common transition end timing te_ABC. That is, on the basis of the required transition times TdA, TdB, and TdC for light intensity reduction of the individual lamps, light intensity transition is started respectively at appropriate timings ts_A, ts_B, and ts_C so that the light intensity transition end timings of the plurality of lamps can be controlled in an integrated manner. As a result, a sense of unification is obtained in the light control of the plurality of lamps on the vehicle felt by a user such as a driver of a vehicle. Thus, a sense of uneasiness is avoided and a sense of high quality can be realized as the entirety of the lighting system.

Second Embodiment

A second exemplary embodiment is a modification to the first exemplary embodiment given above. Also in the second exemplary embodiment, the lighting control system 100 having the same configuration as that of FIG. 1 may be employed.

For example, in the example of operation shown in FIG. 3, there is only one transition slope value Kd0 for the light intensity reduction with respect to a plurality of lamps to be controlled. However, for example, in a case in which light control circuits 12A, 12B shown in FIG. 1 are configured to individually perform pulse width modulation (PWM) control to adjust the light intensities, the transition slope (corresponding to Kd0) at the time of switching the light intensities of the light sources 13A, 13B may be selected from a plurality of slopes. In a case in which the slope of the light intensity switching transition is variable, for example, the time periods TdA, TdB, TdC required for the transitions of reducing the light intensity as shown in FIG. 3 vary depending on the slope. Thus, when the control of FIG. 2 is applied, the timing te_ABC at which the transition ends becomes different for each lamp.

Figure 5:
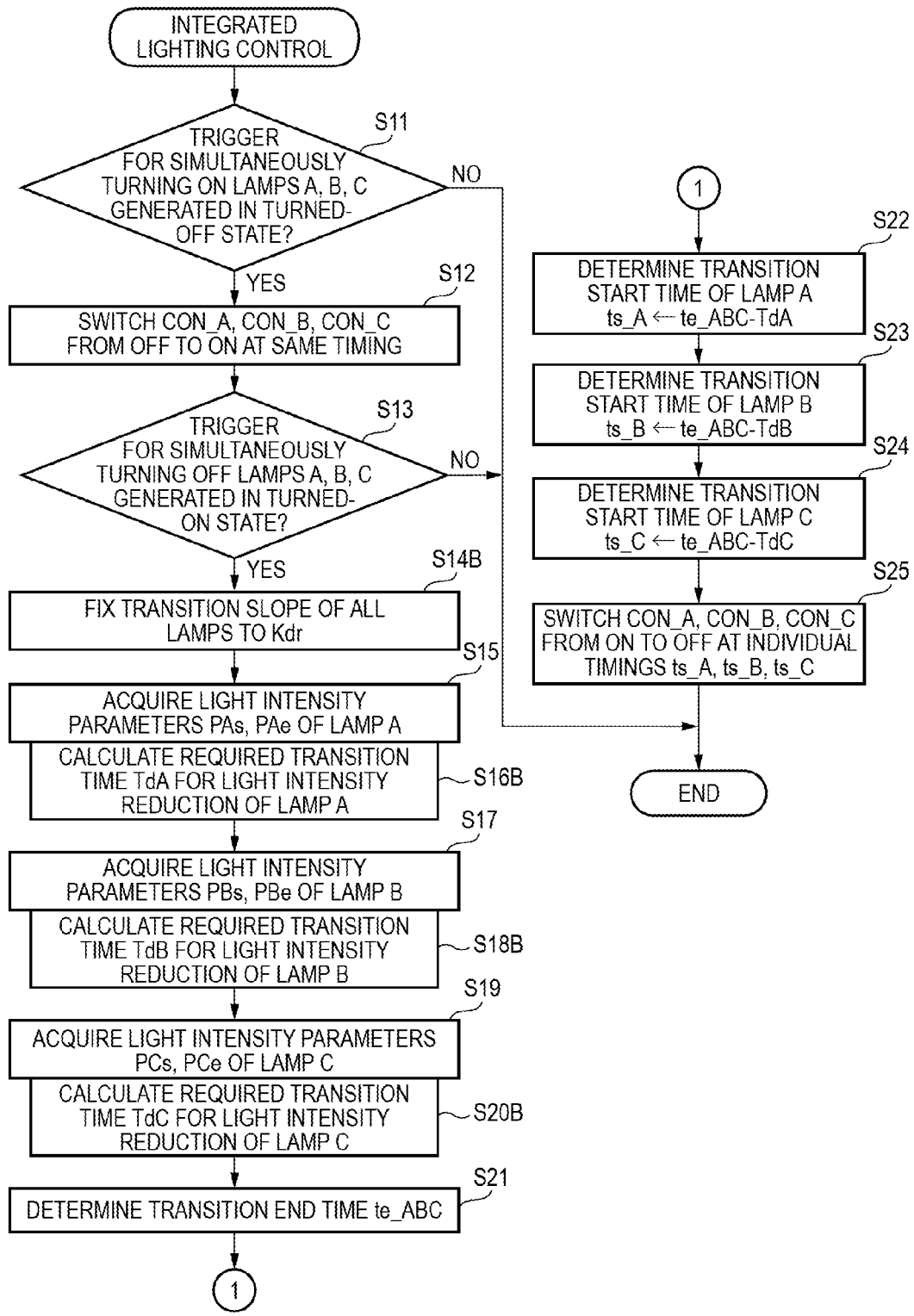
FIG. 5 is a flow chart of a processing algorithm of another example of the integrated lighting control applicable to the lighting control system of FIG. 1.

According to the second exemplary embodiment, the lighting control system 100 executes a processing algorithm of an integrated control shown in FIG. 5, instead of the control shown in FIG. 2, so as to avoid a situation where the transition end timing te_ABC is different for each lamp.

The processing algorithm of the integrated lighting control of FIG. 5 will be described below. In FIG. 5, steps corresponding to those of FIG. 2 are designated by the same numerals. In the following, description is omitted for the same steps as those in the processing of FIG. 2.

In Step S14B of FIG. 5, the integrated lighting controller 11 acquires a reference value Kdr which is a constant common to all lamps and serves as a reference value of the transition slope value for the light intensity reduction. Then, the integrated lighting controller 11 performs control such that the slopes of transition characteristics of all light sources 13A, 13B, 13C are fixed to the reference value Kdr. For example, in a case that the slope value of the light source 13C cannot be changed, this slope value is adopted as the reference value Kdr and then the slopes of transition characteristics of the light sources 13A and 13B are changes into the reference value Kdr. For example, when the duty cycle controlled by the light control circuit 12A and the duty cycle controlled by the light control circuit 12B are adjusted, the slopes of transition characteristics of the light sources 13A and 13B can be made equal to the reference value Kdr.

In Step S16B, the integrated lighting controller 11 calculates a required transition time TdA for light intensity reduction of the lamp A. That is, based on the transition start light intensity parameter PAs and the transition end light intensity parameter PAe shown in FIG. 3 as well as the common transition slope value Kdr for the light intensity reduction, the required transition time TdA for light intensity reduction corresponding to the time difference from the transition start timing ts_A to the transition end timing te_ABC is calculated by the following formula.

$$TdA=te\_ABC-ts\_A=(PAs-PAe)/Kdr$$

Here, in a case in which the results of calculation performed in advance have been saved as the data of constants in the memory inside the integrated lighting controller 11, an appropriate TdA can selectively be acquired based on the parameters PAs, PAe, Kdr without calculation.

Similarly, in Step S18B, the integrated lighting controller 11 calculates a required transition time TdB for light intensity reduction of the lamp B. That is, based on the transition start light intensity parameter PBs and the transition end light intensity parameter PBe shown in FIG. 3 as well as the common transition slope value Kdr for the light intensity reduction, the required transition time TdB for light intensity reduction corresponding to the time difference from the transition start timing ts_B to the transition end timing te_ABC is calculated by the following formula.

$$TdB=te\_ABC-ts\_B=(PBs-PBe)/Kdr$$

Similarly, in Step S20B, the integrated lighting controller 11 calculates a required transition time TdC for light intensity reduction of the lamp C. That is, based on the transition start light intensity parameter PCs and the transition end light intensity parameter PCe shown in FIG. 3 as well as the common transition slope value Kdr for the light intensity reduction, the required transition time TdC for light intensity reduction corresponding to the time difference from the transition start timing ts_C to the transition end timing te_ABC is calculated by the following formula.

$$TdC=te\_ABC-ts\_C=(PCs-PCe)/Kdr$$

Third Embodiment

A third exemplary embodiment is a modification to the first exemplary embodiment given above. Also in the third exemplary embodiment, the lighting control system 100 having the same configuration as that of FIG. 1 may be employed.

In the third exemplary embodiment, a plurality of slope characteristics of transition is available at the time of reducing the light intensities of the light sources 13A, 13B, 13C. For example, in the example of operation shown in FIG. 9, the transition slope value KdA of the lamp A, the transition slope value KdB of the lamp B, and the transition slope value KdB of the lamp B are different from each other. In such a situation, for example, the time periods TdA, TdB, TdC required for the transitions of reducing the light intensity as shown in FIG. 3 vary depending on the slopes. Thus, when the control of FIG. 2 is applied, the timing te_ABC at which the transition ends becomes different for each lamp.

Figure 6:
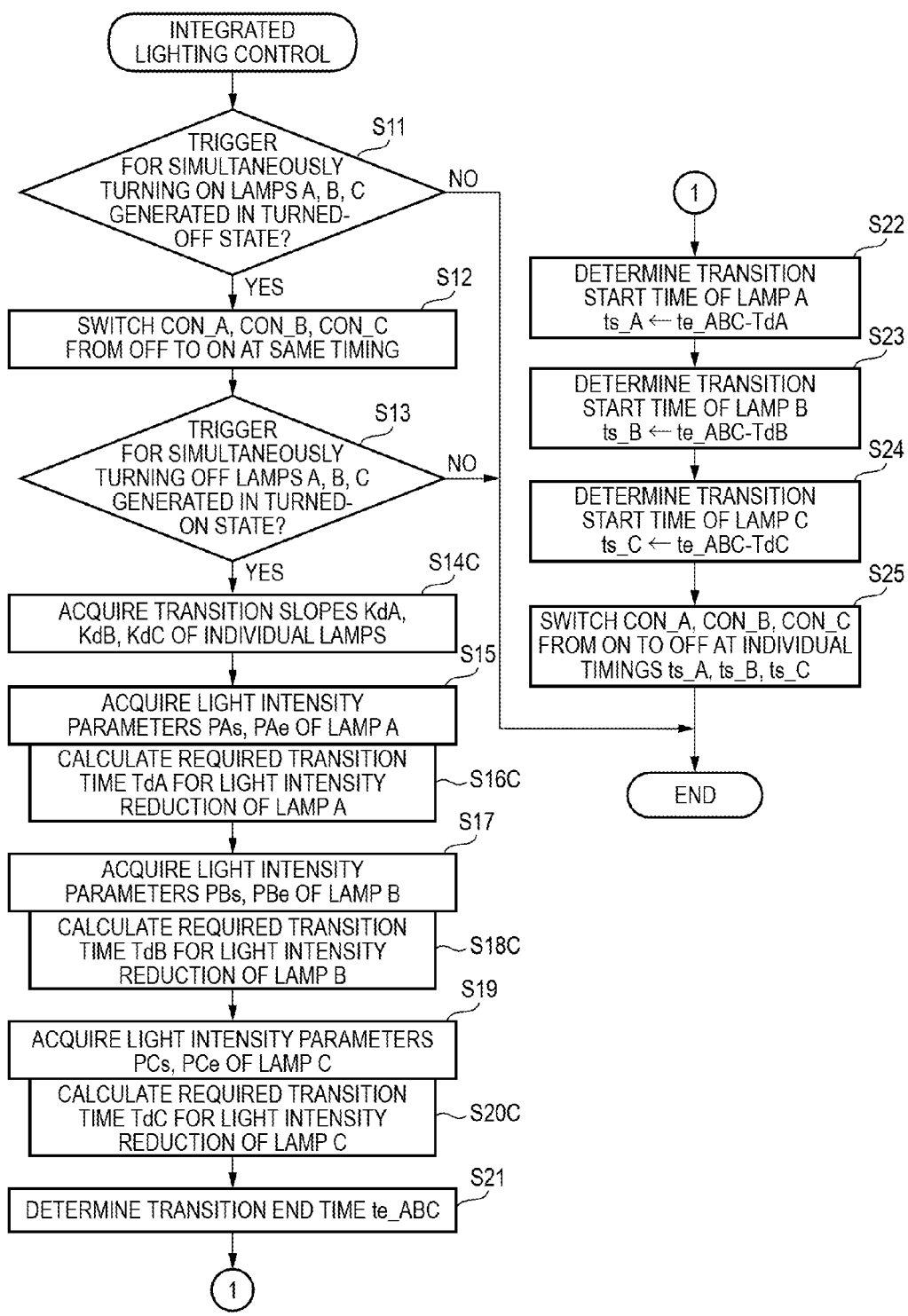
FIG. 6 is a flow chart of a processing algorithm of another example of the integrated lighting control applicable to the lighting control system of FIG. 1.

According to the third exemplary embodiment, the lighting control system 100 executes the processing algorithm of the integrated lighting control of FIG. 6, instead of the control of FIG. 2, so as to avoid a situation where the transition end timing te_ABC is different for each lamp.

The processing algorithm of the integrated lighting control of FIG. 6 will be described below. In FIG. 6, steps corresponding to those of FIG. 2 are designated by the same numerals. In the following, description is omitted for the same steps as those in the processing of FIG. 2.

In Step S14C of FIG. 6, the integrated lighting controller 11 acquires the present transition slope values KdA, KdB, and KdC of the individual lamps. The transition slope values KdA, KdB, and KdC may be defined by constants that express light emission transition characteristics specific to the light sources 13A, 13B, 13C and/or the present control statuses (such as duty change rates) of the light control circuits 12A and 12B.

In Step S16C, the integrated lighting controller 11 calculates a required transition time TdA for light intensity reduction of the lamp A. That is, based on the transition start light intensity parameter PAs, the transition end light intensity parameter PAe and the transition slope value KdA for the light intensity reduction shown in FIG. 9, the required transition time TdA for light intensity reduction corresponding to the time difference from the transition start timing ts_A to the transition end timing te_ABC is calculated by the following formula.

$$TdA=te\_ABC-ts\_A=(PAs-PAe)/KdA$$

Here, in a case in which the results of calculation performed in advance have been saved as the data of constants in the memory inside the integrated lighting controller 11, an appropriate TdA can selectively be acquired based on the parameters PAs, PAe, KdA without calculation.

Similarly, in Step S18C, the integrated lighting controller 11 calculates a required transition time TdB for light intensity reduction of the lamp B. That is, based on the transition start light intensity parameter PBs, the transition end light intensity parameter PBe and the transition slope value KdB for the light intensity reduction shown in FIG. 9, the required transition time TdB for light intensity reduction corresponding to the time difference from the transition start timing ts_B to the transition end timing te_ABC is calculated by the following formula.

$$TdB=te\_ABC-ts\_B=(PBs-PBe)/KdB$$

Similarly, in Step S20C, the integrated lighting controller 11 calculates a required transition time TdC for light intensity reduction of the lamp C. That is, based on the transition start light intensity parameter PCs, the transition end light intensity parameter PCe and the transition slope value KdC for the light intensity reduction shown in FIG. 9, the required transition time TdC for light intensity reduction corresponding to the time difference from the transition start timing ts_C to the transition end timing te_ABC is calculated by the following formula.

$$TdC=te\_ABC-ts\_C=(PCs-PCe)/KdC$$

Figure 9:
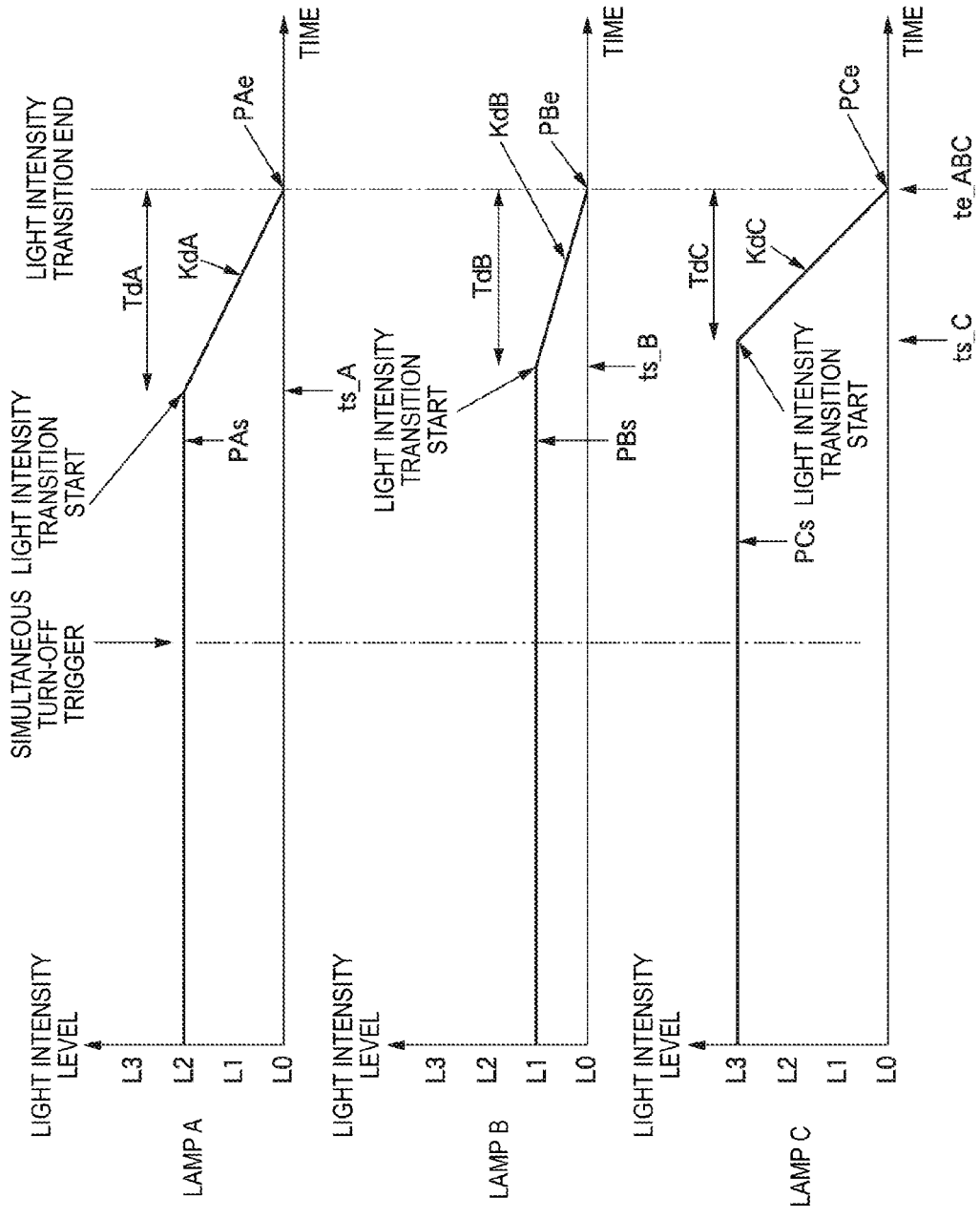
FIG. 9 is a time chart showing an example of operations in a case of executing the processing algorithm of FIG. 6.

When the processing shown in FIG. 6 is executed, even in a case that the slope characteristics of light intensity transition is different for each lamp as shown in FIG. 9, appropriate required transition times TdA, TdB, and TdC for light intensity reduction can be calculated so that light intensity transition can be started at appropriate timings (ts_A, ts_B, ts_C) and hence the transition end timing te_ABC can be made to be the same for all lamps.

Fourth Embodiment

A fourth exemplary embodiment is a modification to the third exemplary embodiment given above. Also in the fourth exemplary embodiment, the lighting control system 100 having the same configuration as that of FIG. 1 may be employed.

In the fourth exemplary embodiment, similarly to the third exemplary embodiment, a plurality of of slope characteristics of transition is available at the time of reducing the light intensities of the light sources 13A, 13B, 13C, but the transition start light intensity level and the transition end light intensity level are common to all lamps.

Figure 7:
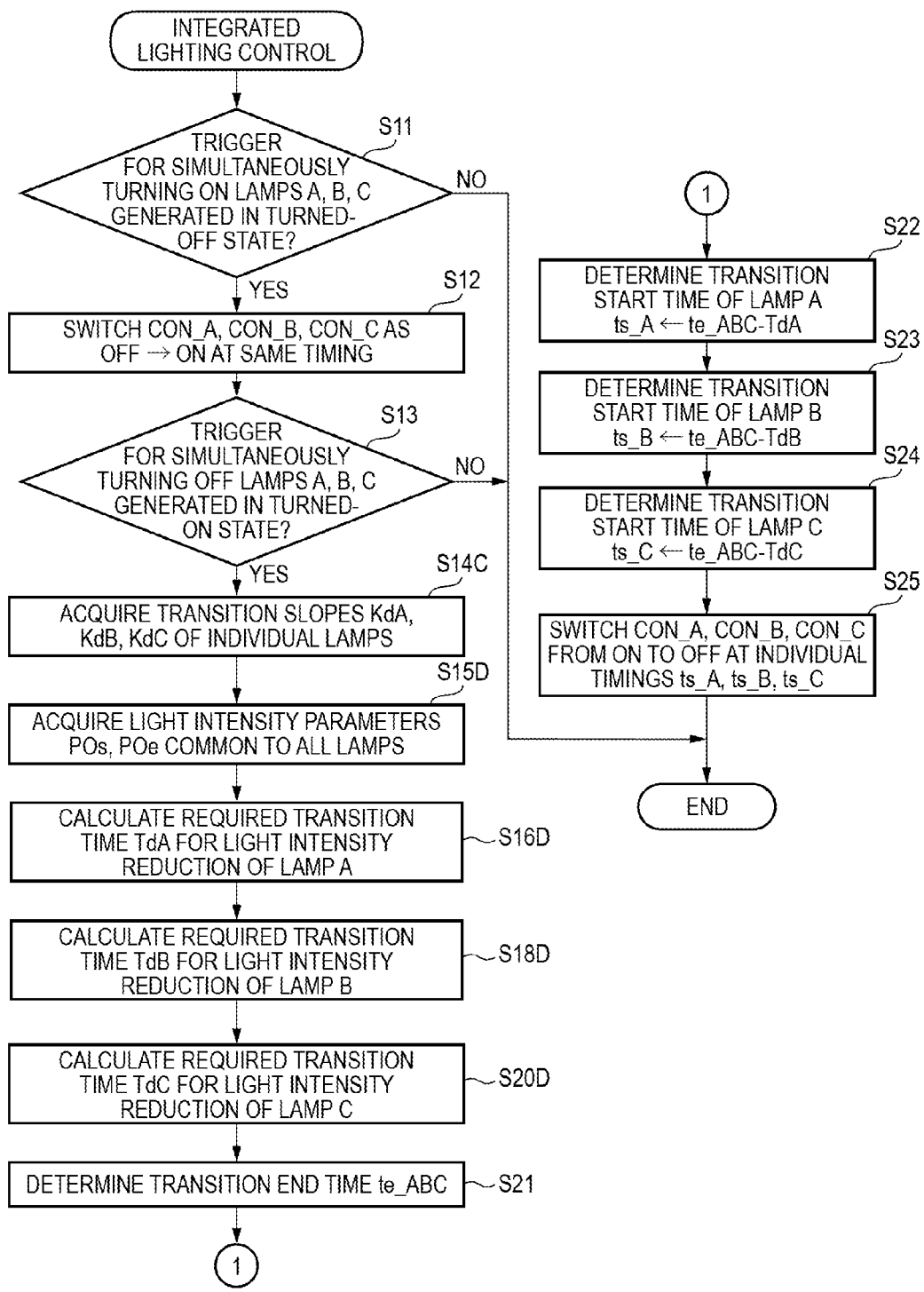
FIG. 7 is a flow chart of a processing algorithm of another example of the integrated lighting control applicable to the lighting control system of FIG. 1.

According to the fourth exemplary embodiment, the lighting control system 100 executes the processing algorithm of the integrated lighting control of FIG. 7, instead of the control of FIG. 6, so as to avoid a situation where the transition end timing te_ABC is different for each lamp.

The processing algorithm of the integrated lighting control of FIG. 7 will be described below. In FIG. 7, steps corresponding to those of FIGS. 2 and 6 are designated by the same numerals. In the following, description is omitted for the same steps as those in the processing of FIGS. 2 and 6.

In Step S15D of FIG. 7, the integrated lighting controller 11 acquires a transition start light intensity parameter P0s and a transition end light intensity parameter P0e that are common to all lamps. These light intensity parameters P0s and P0e may be predefined as system-specific constants.

In Step S16D, the integrated lighting controller 11 calculates a required transition time TdA for light intensity reduction of the lamp A. That is, based on the transition start light intensity parameter P0s and the transition end light intensity parameter P0e that are common and on the basis of the transition slope value KdA for the light intensity reduction, the required transition time TdA for light intensity reduction corresponding to the time difference from the transition start timing ts_A to the transition end timing te_ABC is calculated by the following formula.

$$TdA = te\_ABC - ts\_A = (P0s - P0e)/KdA$$

Here, in a case in which the results of calculation performed in advance have been saved as the data of constants in the memory inside the integrated lighting controller 11, an appropriate TdA can selectively be acquired based on KdA without calculation.

Similarly, in Step S18D, the integrated lighting controller 11 calculates a required transition time TdB for light intensity reduction of the lamp B. That is, based on the transition start light intensity parameter P0s and the transition end light intensity parameter P0e that are common and on the basis of the transition slope value KdB for the light intensity reduction, the required transition time TdB for light intensity reduction corresponding to the time difference from the transition start timing ts_B to the transition end timing te_ABC is calculated by the following formula.

$$TdB = te\_ABC - ts\_B = (P0s - P0e)/KdB$$

Similarly, in Step S20D, the integrated lighting controller 11 calculates a required transition time TdC for light intensity reduction of the lamp C. That is, based on the transition start light intensity parameter P0s and the transition end light intensity parameter P0e that are common and on the basis of the transition slope value KdC for the light intensity reduction, the required transition time TdC for light intensity reduction corresponding to the time difference from the transition start timing ts_C to the transition end timing te_ABC is calculated by the following formula.

$$TdC = te\_ABC - ts\_C = (P0s - P0e)/KdC$$

Fifth Embodiment

A fifth exemplary embodiment is a modification to the third exemplary embodiment given above. Also in the fifth exemplary embodiment, the lighting control system 100 having the same configuration as that of FIG. 1 may be employed.

In the fifth exemplary embodiment, similarly to the third exemplary embodiment, a plurality of slope characteristics of transition is available at the time of reducing the light intensities of the light sources 13A, 13B, 13C. In addition, the slope characteristics is adjustable for at least one of the lamps. For example, the slope of light intensity transition at the time of switching the light intensity of the light source 13A shown in FIG. 1 depends on specific characteristics of the light source 13A. However, the slope can be made smaller by, for example, adjusting the duty cycle through the light control circuit 12A.

Figure 8:
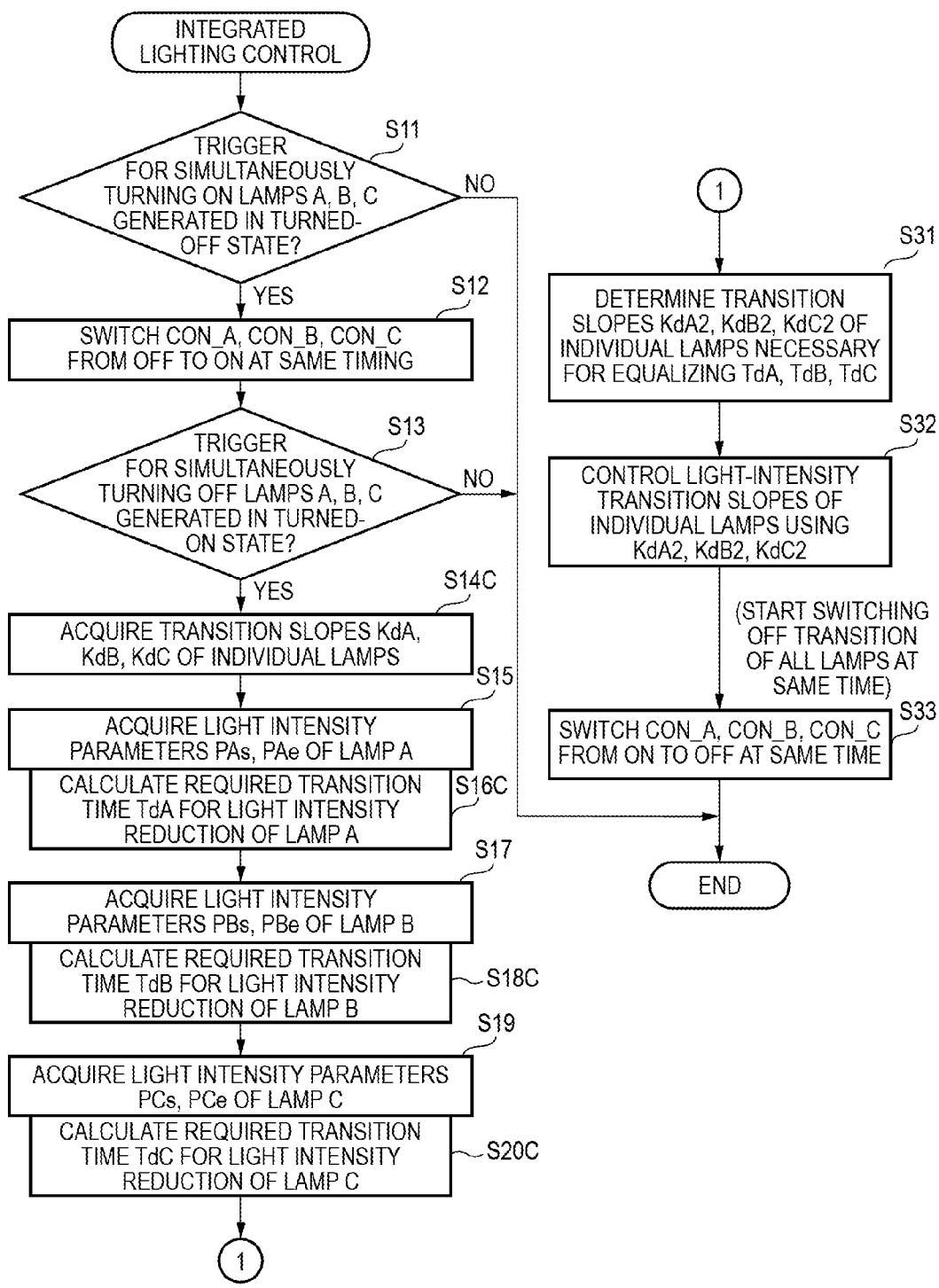
FIG. 8 is a flow chart of a processing algorithm of another example of the integrated lighting control applicable to the lighting control system of FIG. 1.

According to the fifth exemplary embodiment, the lighting control system 100 executes the processing algorithm of the integrated lighting control of FIG. 8, instead of the control of FIG. 6, so as to avoid a situation where the transition end timing te_ABC is different for each lamp without need to individually determining the transition start timings ts_A, ts_B, ts_C for the respective lamps.

The processing algorithm of the integrated lighting control of FIG. 8 will be described below. In FIG. 8, steps corresponding to those of FIGS. 2 and 6 are designated by the same numerals. In the following, description is omitted for the same steps as those in the processing of FIGS. 2 and 6.

In Step S31 of FIG. 8, the integrated lighting controller 11 determines transition slope values KdA2, KdB2, and KdC2 of the individual lamps which are necessary for making equal to each other the required transition times TdA, TdB, and TdC for light intensity reduction of the individual lamps.

That is, in a case in which transition slope values KdA, KdB, and KdC are employed intact, as shown in FIG. 10, the required transition times TdA, TdB, and TdC for light intensity reduction are different from each other. Thus, when light intensity transition is started at the same time ts, the transition end timing te_ABC becomes different for each lamp. Thus, the required transition times TdA, TdB, and TdC for light intensity reduction are changed into TdA2, TdB2, and TdC2 having the same length and then transition slope values KdA2, KdB2, and KdC2 necessary for making the length from ts to te_ABC the same are calculated at S31.

For example, in the example of FIG. 10, TdA2 and TdB2 are adjusted such as to become equal to TdC having the maximum length among the three required transition times TdA, TdB, and TdC for light intensity reduction. Specifically, when the transition slope value KdA of the lamp A is reduced, the required transition time TdA for light intensity reduction increases. Thus, TdA2 can be made equal to the length of TdC. The slope at the time of this equalization is KdA2. A similar situation holds also for the lamp B.

In Step S32, the integrated lighting controller 11 controls the individual lamps such that the transition slope values KdA2, KdB2, and KdC2 determined at S31 are realized. For example, the duty cycle of the light control circuit 12A is adjusted so that the transition slope KdA of the light source 13A is changed into KdA2 as shown in FIG. 10. Alternatively, the duty cycle of the light control circuit 12B is adjusted so that the transition slope KdB of the light source 13B is changed into KdB2.

In Step S33, at a predetermined common timing ts (see FIG. 10), the integrated lighting controller 11 switches each of the control signals CON_A, CON_B, and CON_C from ON to OFF. By virtue of this, as shown in FIG. 10, light intensity transition of the lamp A, the lamp B, and the lamp C is started at the common timing ts.

Here, the slopes of transition of the individual lamps have been changed into KdA2, KdB2, and KdC2 at S32. Thus, the required time until the light intensity transition of the lamp A is completed is TdA2 and hence the transition is completed at the transition end timing te_ABC. Further, the required time until the light intensity transition of the lamp B is completed is TdB2 and hence the transition is completed at the transition end timing te_ABC. That is, even when the light intensity transition of all lamps is started at the common timing ts, the light intensity transition of all lamps can be completed at the same time (te_ABC).

Here, some aspects of the exemplary embodiments described above will be briefly summarized below.

A lighting control system includes a plurality of light sources (e.g., the light sources 13A to 13C), a plurality of light source drivers the circuits 12A to 12C), each of the light sources drivers being configured to adjust a light emission intensity of an associated one of the light sources in at least two levels, and an integrated controller (e.g., the integrated lighting controller 11) configured to control the light source drivers to control conditions of the light sources in an integrated manner. The integrated controller is configured to control the light source drivers to execute a light intensity transition of reducing the light emission intensity from a first light intensity level (e.g., the light intensity levels PAs, PBs, PCs) to a second light intensity level (e.g., the light intensity levels PAe, PBe, PCe) that is lower than the first light intensity level with respect to each of the light sources such that a timing at which the light intensity transition ends (e.g., the timing te_ABC) is substantially the same for each of the light sources (see, e.g., FIGS. 2 and 3). The second light intensity level may include a level (e.g., the level L0) at which the light emission intensity is zero.

According to this configuration, at the time of the light intensity transition of reducing the light intensity, the light source driers are controlled such that the tuning at which the light intensity transition ends is substantially the same for each of the light sources. That is, the light intensity transition of the plurality of light sources stops simultaneously. Therefore, a driver of a vehicle feels that the light sources are controlled in an integrated manner.

The integrated controller may be configured to execute the light intensity transition such that, in a case in which at least one of the first light intensity level (e.g., the light intensity levels PAs, PBs, PCs) and the second light intensity level (e.g., the light intensity levels PAe, PBe, PCe) is different between the light sources, the light intensity transition starts at an individual timing for each of the light sources.

According to this configuration, the timing for starting the light intensity transition is determined individually for each of the light sources. Thus, even when the required transition time from the light intensity transition start to the light intensity transition end is different for each of the light sources, the timing at which the light intensity transition ends can be made to be substantially the same for each of the light sources.

The integrated controller may be configured to determine, in a case in which a slope characteristic of the light intensity transition is substantially the same (e.g., the slope characteristic Kd0) for each of the light sources, the individual timing at which the light intensity transition starts for each of the light sources based on the first light intensity level and the second light intensity level of each of the light sources, the slope characteristic, and the timing at which the light intensity transition ends (e.g., Steps S16, S18, S20, and S22 to S24).

According to this configuration, the timing for starting the light intensity transition is determined individually for each of the light sources based on the first light intensity level and the second light intensity level of each of the light sources, the slope characteristic, and the timing at which the light intensity transition ends. Thus, even when the first light intensity level or the second light intensity level is different between the light sources, the timing at which the light intensity transition ends can be made to be substantially the same for each of the light sources.

The integrated controller may be configured to execute the light intensity transition using, in a case in which a plurality of slope characteristics of the light intensity transition are available for the plurality of light sources, the slope characteristic (e.g., the slope characteristic Kdr) that is preselected from the plurality of slope characteristics (e.g., FIG. 5, S14B, S16B, S18B and S20B).

According to this configuration, the slope characteristics at the time of transition of reducing the light intensity is common to all light sources. Thus, the timing for starting the light intensity transition can appropriately be determined.

The integrated controller may be configured to determine, in a case in which a plurality of slope characteristics (e.g., the slope characteristics KdA, KdB, KdC) of the light intensity transition are available for the plurality of light sources, the individual timing at which the light intensity transition starts for each of the light sources based on the first light intensity level and the second light intensity level of each of the light sources, a corresponding one of the slope characteristics of the light intensity transition of each of the light sources, and the timing at which the light intensity transition ends (e.g., FIG. 6, S14C, S16C, S18C, S20C and S22 to S24).

According to this configuration, even in a case in which a plurality of light sources individually having various characteristics are to be controlled in an integrated manner, the timing for starting the light intensity transition can appropriately be determined for each of the light sources such that the timing at which light intensity transition ends can be made to be substantially the same for each of the light sources.

The integrated controller may be configured to determine, in a case in which the first light intensity level and the second light intensity level are common to the plurality of light sources and in which a plurality of slope characteristics of the light intensity transition are available for the plurality of light sources, the individual timing at which the light intensity transition starts for each of the light sources based on the first light intensity level and the second light intensity level, a corresponding one of the slope characteristics of light intensity transition of each of the light sources, and the timing at which the light intensity transition ends (e.g., FIG. 7, S15D, S16D, S18D, S20D and S22 to S24).

According to this configuration, even in a case in which a plurality of light sources individually having various characteristics are to be controlled in an integrated manner, the timing for starting the light intensity transition can appropriately be determined for each of the plurality of light sources such that the timing at which the light intensity transition ends can be made to be substantially the same for each of the light sources.

The integrated controller may be configured to adjust, in a case in which in a slope characteristic (e.g., the slope characteristics KdA, KdB, KdC) of the light intensity transition is variable for at least one of the light sources, the slope characteristic of the light intensity transition of the at least one of the light sources such that the light intensity transition of the light sources starts at a common timing (e.g., the timing ts) and such that the timing (e.g., the timing te_ABC) at which the light intensity transition ends is substantially the same for each of the light sources (e.g., FIGS. 8 and 10, S31, S32 and S33).

According to this configuration, the slope characteristics of light intensity transition are adjusted such that the required transition time from the light intensity transition start to the light intensity transition end can be equalized for all the light sources and the timing at which the light intensity transition ends can be made to be substantially the same for each of the light sources.

What is claimed is:

1. A lighting control system comprising:
a plurality of light sources;
a plurality of light source drivers, each of the light source drivers being configured to adjust a light emission intensity of an associated one of the light sources in at least two levels; and
an integrated controller configured to control the light source drivers to control conditions of the light sources in an integrated manner,
wherein the integrated controller is configured to control the light source drivers to execute a light intensity transition of reducing the light emission intensity from a first light intensity level to a second light intensity level that is lower than the first light intensity level with respect to each of the light sources such that a timing at which the light intensity transition ends is substantially the same for each of the light sources.

2. The lighting control system according to claim 1, wherein the integrated controller is configured to execute the light intensity transition such that, in a case in which at least one of the first light intensity level and the second light intensity level is different between the light sources, the light intensity transition starts at an individual timing for each of the light sources.

3. The lighting control system according to claim 2, wherein the integrated controller is configured to determine, in a case in which a slope characteristic of the light intensity transition is substantially the same for each of the light sources, the individual timing at which the light intensity transition starts for each of the light sources based on the first light intensity level and the second light intensity level of each of the light sources, the slope characteristic, and the timing at which the light intensity transition ends.

4. The lighting control system according to claim 3, wherein the integrated controller is configured to execute the light intensity transition using, in a case in which a plurality of slope characteristics of the light intensity transition are available for the plurality of light sources, the slope characteristic that is preselected from the plurality of slope characteristics.

5. The lighting control system according to claim 2, wherein the integrated controller is configured to determine, in a case in which a plurality of slope characteristics of the light intensity transition are available for the plurality of light sources, the individual timing at which the light intensity transition starts for each of the light sources based on the first light intensity level and the second light intensity level of each of the light sources, a corresponding one of the slope characteristics of the light intensity transition of each of the light sources, and the timing at which the light intensity transition ends.

6. The lighting control system according to claim 1, wherein the integrated controller is configured to determine, in a case in which the first light intensity level and the second light intensity level are common to the plurality of light sources and in which a plurality of slope characteristics of the light intensity transition are available for the plurality of light sources, the individual timing at which the light intensity transition starts for each of the light sources based on the first light intensity level and the second light intensity level, a corresponding one of the slope characteristics of light intensity transition of each of the light sources, and the timing at which the light intensity transition ends.

7. The lighting control system according to claim 1, wherein the integrated controller is configured to adjust, in a case in which in a slope characteristic of the light intensity transition is variable for at least one of the light sources, the slope characteristic of the light intensity transition of the at least one of the light sources such that the light intensity transition of the light sources starts at a common timing and such that the timing at which the light intensity transition ends is substantially the same for each of the light sources.

8. The light control system according to claim 1, wherein the second light intensity level includes a level at which the light emission intensity is zero.

* * * * *